(12) United States Patent
Li et al.

(10) Patent No.: US 8,387,448 B2
(45) Date of Patent: Mar. 5, 2013

(54) METHOD FOR MONITORING EXHAUST GAS AFTERTREATMENT DEVICES

(75) Inventors: Wei Li, Troy, MI (US); David B. Brown, Brighton, MI (US); Chang H. Kim, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 144 days.

(21) Appl. No.: 13/008,937

(22) Filed: Jan. 19, 2011

(65) Prior Publication Data

US 2012/0180558 A1   Jul. 19, 2012

(51) Int. Cl.
   *G01M 15/10*   (2006.01)
(52) U.S. Cl. .................................................. 73/114.75
(58) Field of Classification Search ................ 73/114.75
   See application file for complete search history.

(56) References Cited

U.S. PATENT DOCUMENTS

| | | | | |
|---|---|---|---|---|
| 7,111,451 B2* | 9/2006 | Dou et al. | | 60/285 |
| 8,033,168 B2* | 10/2011 | Katoh et al. | | 73/114.75 |
| 8,091,416 B2* | 1/2012 | Wang et al. | | 73/114.75 |
| 8,109,081 B2* | 2/2012 | Perry et al. | | 60/286 |
| 8,141,340 B2* | 3/2012 | Garimella et al. | | 60/277 |
| 8,171,781 B2* | 5/2012 | Shibata et al. | | 73/114.75 |
| 8,186,151 B2* | 5/2012 | Viola et al. | | 60/295 |
| 8,201,444 B2* | 6/2012 | Wang et al. | | 73/114.75 |
| 2006/0053772 A1* | 3/2006 | Dou et al. | | 60/285 |
| 2009/0272099 A1* | 11/2009 | Garimella et al. | | 60/277 |
| 2010/0242454 A1* | 9/2010 | Holderbaum | | 60/301 |
| 2011/0173955 A1* | 7/2011 | Sun | | 60/277 |

OTHER PUBLICATIONS

U.S. Appl. No. 12/689,483, filed Jan. 31, 2008, Michael Viola.
Wei Li, Passive Ammonia SCR System for Lean-burn SIDI Engines, SAE 2010-01-0366, Apr. 13-15, 2010, Detroit, MI.

* cited by examiner

Primary Examiner — Freddie Kirkland, III

(57) ABSTRACT

A method for monitoring performance of a passive selective catalytic reduction system includes operating the internal combustion engine in a preconditioning mode. Subsequent to the preconditioning, an air/fuel excursion is introduced into the exhaust gas feedstream and a signal output from a sensor monitoring the exhaust gas feedstream in the selective catalytic reduction system during the air/fuel excursion is monitored. An operating effectiveness is determined for the selective catalytic reduction system correlated to the signal output from the sensor monitoring the exhaust gas feedstream.

20 Claims, 6 Drawing Sheets

METHOD FOR MONITORING EXHAUST GAS AFTERTREATMENT DEVICES

TECHNICAL FIELD

This disclosure is related to the monitoring of the aftertreatment of exhaust emissions from internal combustion engines.

BACKGROUND

The statements in this section merely provide background information related to the present disclosure and may not constitute prior art.

Emissions control is a factor in engine design and engine control. Oxides of nitrogen, NOx, are known by-products of combustion. NOx is created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures. Reductions of NOx created in the combustion process and management of NOx in an exhaust aftertreatment system are desirable.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas feedstream temperatures and engine air/fuel ratio. Additionally, aftertreatment devices include materials, such as catalyst beds, prone to damage or degradation as a result of use over time and exposure to high temperatures.

Engine control methods may utilize diverse operating strategies to optimize combustion to generate work. Some operating strategies for optimizing combustion include lean, localized, or stratified combustion within the combustion chamber in order to reduce a fuel charge operating in an unthrottled condition to reduce air intake pumping losses. While temperatures in the combustion chamber can get high enough in pockets of combustion to create significant quantities of NOx, the overall energy output of the combustion chamber, in particular, the heat energy expelled from the engine through the exhaust gas feedstream can be greatly reduced from peak values. The reduced heat energy can be challenging to exhaust aftertreatment strategies, since aftertreatment devices frequently require an elevated operating temperature, driven by the exhaust gas feedstream temperature, to operate adequately to treat NOx emissions.

Aftertreatment devices effect chemical reactions to treat exhaust gas feedstream. One exemplary aftertreatment device includes a selective catalytic reduction device (SCR). Known SCR devices utilize ammonia derived from urea injection to treat NOx. Ammonia stored on a catalyst bed within the SCR reacts with NOx, preferably in a desired proportion of NO and $NO_2$, and produces favorable reactions to reduce NOx. Since urea injection devices require participation by the owner in monitoring and maintaining fluid levels, passive SCR devices are preferred because they do not employ urea injection devices. Passive SCR devices rely on a catalyst, such as a three-way catalyst, to convert exhaust derived from a rich combustion process to ammonia for storage on a bed of the SCR. The passive SCR devices utilize the ammonia to reduce NOx.

SUMMARY

A passive selective catalytic reduction system configured to treat an exhaust gas feedstream from an internal combustion engine includes a three-way catalytic device fluidly coupled upstream of a selective catalytic reduction catalyst. A method for monitoring performance of the passive selective catalytic reduction system includes operating the internal combustion engine in a preconditioning mode. Subsequent to the preconditioning, an air/fuel excursion is introduced into the exhaust gas feedstream and a signal output from a sensor monitoring the exhaust gas feedstream in the selective catalytic reduction system during the air/fuel excursion is monitored. An operating effectiveness is determined for the selective catalytic reduction system correlated to the signal output from the sensor monitoring the exhaust gas feedstream. Such determination includes determining an operating effectiveness for the three-way catalytic device correlated to the signal output from the sensor monitoring the exhaust gas feedstream, and determining an operating effectiveness for the selective catalytic reduction catalyst correlated to the signal output from the sensor monitoring the exhaust gas feedstream.

BRIEF DESCRIPTION OF THE DRAWINGS

One or more embodiments will now be described, by way of example, with reference to the accompanying drawings, in which.

DETAILED DESCRIPTION

Figure 1:
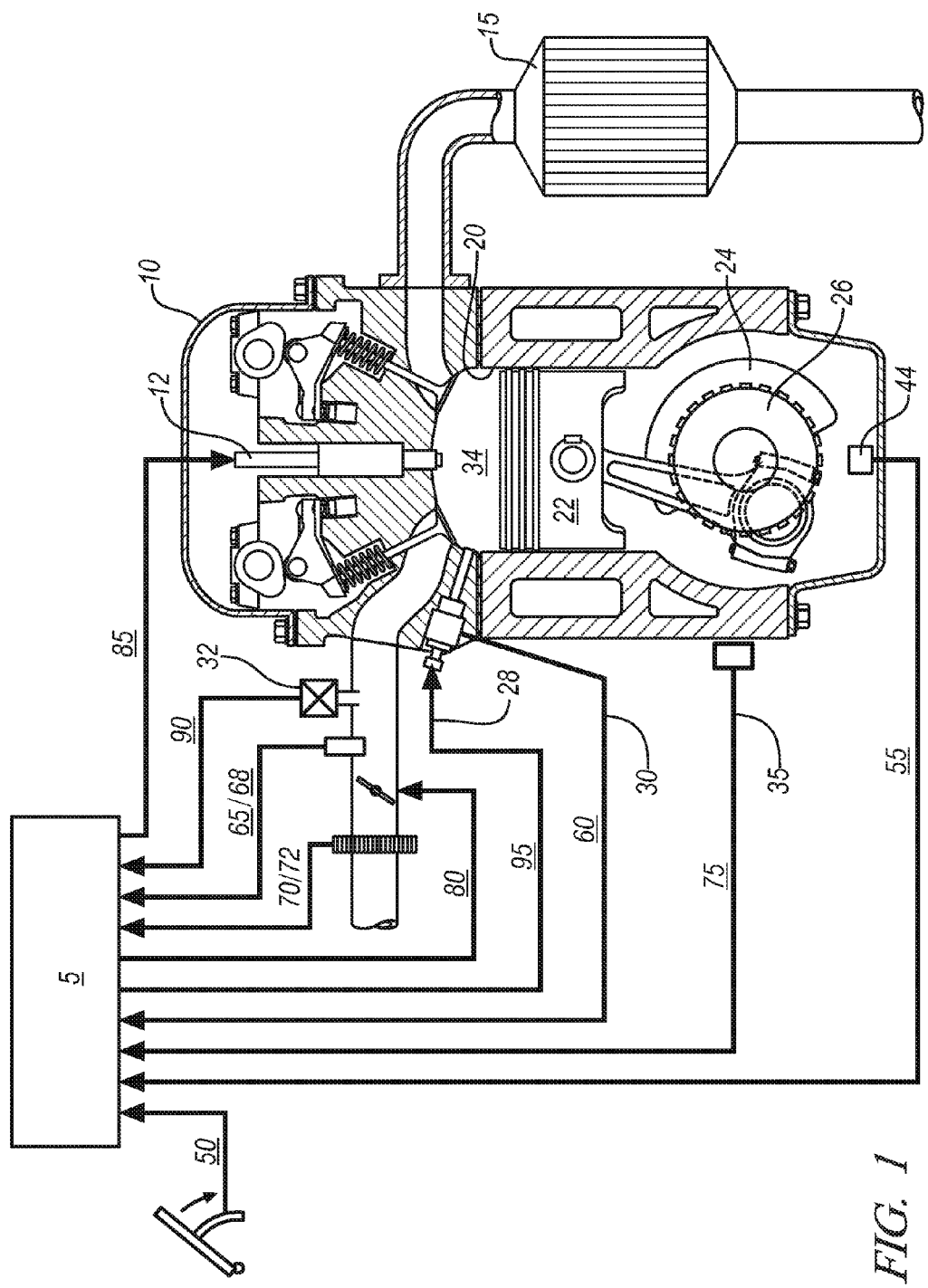
FIG. 1 is a schematic diagram depicting an internal combustion engine and control module, and passive selective catalytic reduction system, in accordance with the present disclosure.

Referring now to the drawings, wherein the showings are for the purpose of illustrating certain exemplary embodiments only and not for the purpose of limiting the same, FIG. 1 is a schematic diagram depicting an internal combustion engine 10 and control module 5, and selective catalytic reduction system 15, in accordance with the present disclosure. The exemplary engine 10 is a multi-cylinder, direct-injection internal combustion engine 10 having reciprocating pistons 22 attached to a crankshaft 24 and movable in cylinders 20 which define variable volume combustion chambers 34. Engines 10 are known to operate under compression ignition or spark ignition. Additionally, methods are known to utilize either ignition strategy in a single engine 10, modulating strategy based upon factors such as engine speed and load. This disclosure is intended to include these exemplary embodiments of engine operation, but is not intended to be limited thereto. The crankshaft 24 is mechanically coupled to a vehicle transmission and driveline to deliver tractive torque thereto, in response to an operator torque request (50). The engine 10 preferably employs a four-stroke operation wherein each engine combustion cycle has 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine 10 includes sensing devices to monitor engine operation, and actuators which control engine operation. The sensing devices and actuators are signally or operatively connected to control module 5.

The engine 10 preferably is a direct-injection, four-stroke, internal combustion engine 10 including a variable volume combustion chamber 34 defined by the piston 22 reciprocating within the cylinder between top-dead-center and bottom-dead-center points and a cylinder head including an intake valve and an exhaust valve. The piston 22 reciprocates in repetitive cycles each cycle having intake, compression, expansion, and exhaust strokes.

The engine 10 preferably has an air/fuel operating regime that is primarily lean of stoichiometry. The concepts described herein are applicable to other engine configurations that operate primarily lean of stoichiometry, e.g., lean-burn spark-ignition engines. During normal operation of the compression-ignition engine 10, a combustion event occurs during each engine cycle when a fuel charge is injected into the combustion chamber 34 to form, with the intake air, the cylinder charge. The charge is subsequently combusted by action of compression thereof or with the initiation of spark from a spark plug during the compression stroke.

The engine 10 is adapted to operate over a broad range of temperatures, cylinder charge (air, fuel, and, EGR) and injection events. The methods described herein are particularly suited to operation with direct-injection engines 10 operating lean of stoichiometric air/fuel ratio (lean AFR combustion state) to determine parameters which correlate to heat release in each of the combustion chambers 34 during ongoing operation. The methods defined herein are applicable to multiple engine configurations, including spark-ignition engines, compression-ignition engines including those adapted to use homogeneous charge compression ignition (HCCI) strategies. The methods are applicable to systems utilizing multiple fuel injection events per cylinder per engine cycle, e.g., a system employing a pilot injection for fuel reforming, a main injection event for engine power, and, where applicable, a post-combustion fuel injection, a late-combustion fuel injection event for aftertreatment management, each which affects cylinder pressure.

Sensing devices are installed on or near the engine 10 to monitor physical characteristics and generate signals which are correlatable to engine and ambient parameters. The sensing devices include a crankshaft rotation sensor, including a crank sensor 44 for monitoring crankshaft speed (55) through sensing edges on the teeth of the multi-tooth target wheel 26. The crank sensor 44 is known, and may include, e.g., a Hall-effect sensor, an inductive sensor, or a magnetoresistive sensor. The crank sensor 44 signal output (55) is input to the control module 5.

In one embodiment, a combustion pressure sensor 30 has a pressure sensing device adapted to monitor in-cylinder pressure (60). The combustion pressure sensor 30 is preferably non-intrusive and includes a force transducer with an annular cross-section that is adapted to be installed into the cylinder head at an opening for a glow-plug or spark plug 28. The output signal (60) of the sensing element of sensor 30 is proportional to cylinder pressure. The sensing element of sensor 30 has a piezoceramic sensor or other device adaptable as such.

Other sensing devices preferably include a manifold pressure sensor for monitoring manifold pressure (65) and ambient barometric pressure (68), a mass air flow sensor for monitoring intake mass air flow (70) and intake air temperature (72), and a coolant sensor 35 with output (75). The system may include an exhaust gas sensor for monitoring states of one or more exhaust gas parameters, e.g., temperature, air/fuel ratio, and constituents. One having ordinary skill in the art understands that there may other sensing devices and methods for purposes of control and diagnostics.

The operator input, in the form of the operator torque request (50) may be obtained through a throttle pedal and a brake pedal, among other devices. Each of the sensing devices is signally connected to the control module 5 to provide signal information which is transformed by the control module 5 to information representative of the respective monitored parameter. It is understood that this configuration is illustrative, not restrictive, including the various sensing devices being replaceable with functionally equivalent devices and algorithms.

The actuators are installed on the engine 10 and controlled by the control module 5 in response to operator inputs, such as operator torque request (50) to achieve various performance goals. Actuators include an electronically-controlled throttle device which controls throttle opening to a commanded input (80) and a plurality of fuel injectors 12 for directly injecting fuel into each of the combustion chambers in response to a commanded input (85), all of which are controlled in response to the operator torque request (50). There is an exhaust gas recirculation valve 32 and cooler, which controls flow of externally recirculated exhaust gas to the engine intake, in response to a control signal (90) from the control module 5. A glow-plug 28 is installed in each of the combustion chambers and adapted for use with the combustion pressure sensor 30.

The fuel injector 12 is an element of a fuel injection system, which includes a plurality of high-pressure fuel injector devices each adapted to directly inject a fuel charge into one of the combustion chambers 34 in response to the command signal (85) from the control module 5. Each of the fuel injectors 12 are supplied pressurized fuel from a fuel distribution system, and have operating characteristics including a minimum pulsewidth and an associated minimum controllable fuel flow rate, and a maximum fuel flowrate.

The engine 10 may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

Control module, module, controller, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position (80), fuel injection mass and timing (85), EGR valve position to control flow of recirculated exhaust gases (90), glow-plug operation (95), and control of intake and/or exhaust valve timing, phasing, and lift, on systems so equipped. The control module 5 is adapted to receive input signals from the operator (e.g., a throttle pedal position and a brake pedal position) to determine the operator torque request (50) and from the sensors indicating the engine speed (55) and intake air temperature (72), and coolant temperature and other ambient conditions.

Although FIG. 1 describes an exemplary spark ignition engine, it will be appreciated that NOx treatment and aftertreatment systems are utilized in other engine configurations including compression ignition engines, and the disclosure is not intended to be limited to the specific engine embodiment described herein.

Figure 2:
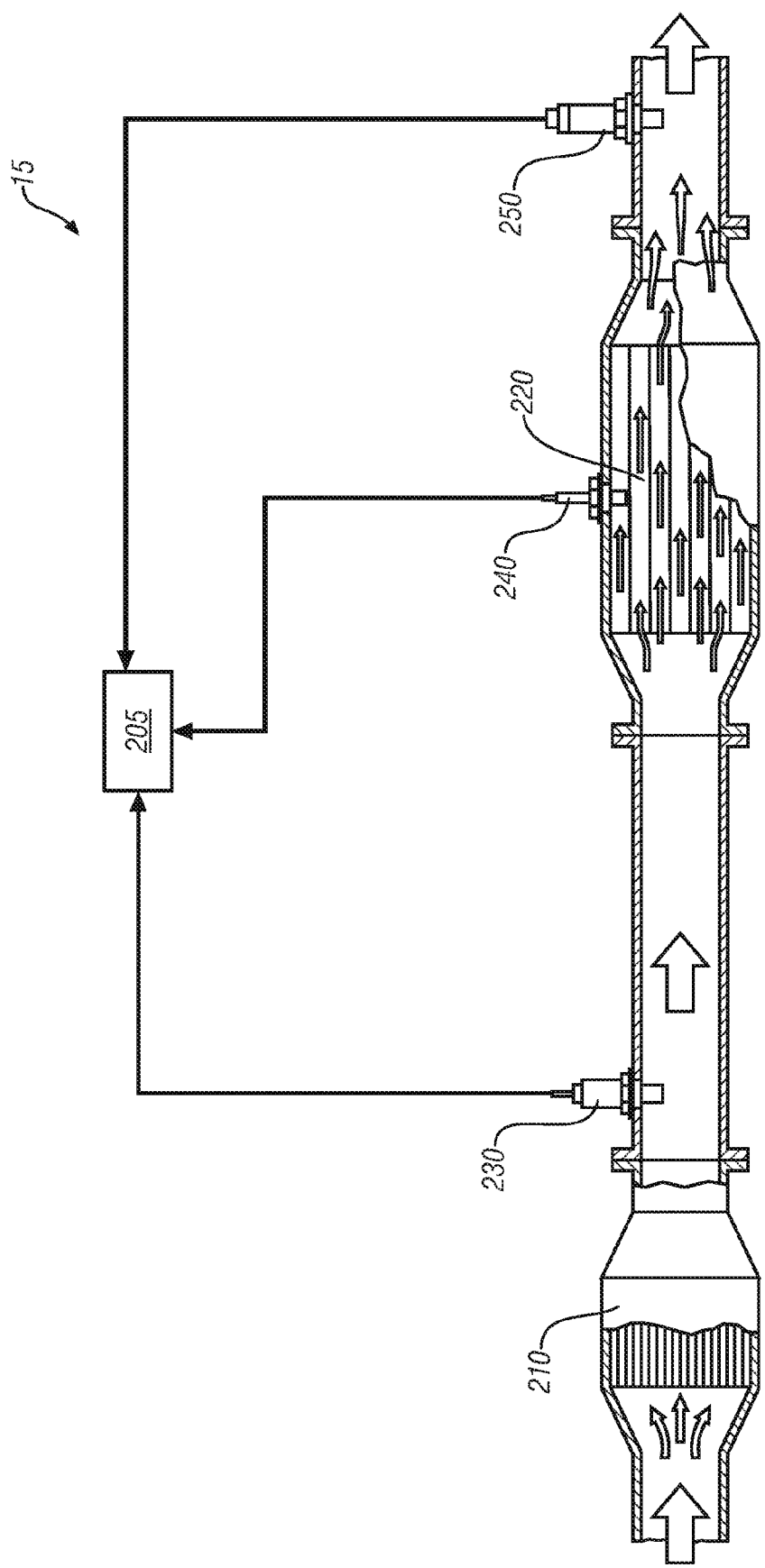
FIG. 2 schematically illustrates an exemplary passive selective catalytic reduction system including a three way catalyst (TWC) and a selective catalytic reduction catalyst (SCR), upstream sensor, mid-brick sensor, and downstream sensor, in accordance with the present disclosure.

FIG. 2 schematically illustrates an exemplary selective catalytic reduction system 15 including a catalyst, such as a three way catalyst (TWC) 210 upstream to a selective catalytic reduction catalyst (SCR) 220. In one embodiment, the selective catalytic reduction system 15 is a passive selective catalytic reduction system. TWC 210 performs a number of catalytic functions necessary for the treatment of an exhaust gas feedstream. One of the functions of TWC 210 is to convert elements of the exhaust gas feedstream to inert gases. The exhaust gas feedstream includes hydrocarbons (HC), carbon monoxide (CO), water ($H_2O$), and NOx. During rich air/fuel ratio (AFR) combustion process the TWC 210 converts the exhaust gas constituents to CO, $H_2O$, and ammonia ($NH_3$). In a passive SCR 220 system, the $NH_3$ is a catalytic fluid deposited on the SCR 220 catalyst and stored thereon. During operation in the lean AFR combustion state, the TWC 210 converts a portion of the exhaust gas feedstream to carbon dioxide ($CO_2$) and $H_2O$, while passing NOx through largely untreated. After $NH_3$ has been stored on the SCR 220 during a rich AFR excursion or combustion state, the SCR 220 utilizes stored $NH_3$ as a reductant to reduce NOx into other molecules during lean operation, such as diatomic nitrogen ($N_2$) and $H_2O$. Elements 230, 240 and 250 denote upstream, mid-brick, and downstream positions, respectively, relative to the SCR 220, and are used to indicate locations of one or both an $NH_3$ sensor 330 and a NOx sensor 335.

A control module 205 signally connects to the $NH_3$ sensor 330 and the NOx sensor 335 located at the upstream position 230, the mid-brick position 240, and the downstream location 250 to receive data therefrom. The $NH_3$ sensor 330 and the NOx sensor 335 monitor exhaust gas constituents, e.g., $NH_3$ and NOx respectively, within the exhaust gas feedstream at respective location(s) and transmit the information to the control module 205. In one embodiment, the control module 205 can monitor a second constituent based upon the first constituent, e.g., the $NH_3$ sensor transmits the concentration of $NH_3$ to the control module 205 and the control module 205 determines the concentration of NOx or the NOx sensor transmits the concentration of NOx to the control module 205 and the control module 205 determines the concentration of $NH_3$.

The upstream sensor 230 monitors exhaust gas constituents between the TWC 210 and the SCR 220. The mid-brick position 240 is located in a region for monitoring exhaust gas constituents within the SCR 220. The downstream position 250 is located in a region that detects and quantifies the exhaust gas constituents after the SCR 220. While the upstream, mid-brick, and downstream positions 230, 240, 250 are illustrated to quantify exhaust gas constituents in the passive selective catalytic reduction system 15, it should be noted that exhaust gas constituents in the passive selective catalytic reduction system 15 can be monitored in the SCR 220 by other means, for example, through virtual sensor modeling engine output and conditions within the exhaust gas feedstream to estimate the presence of NOx within the passive selective catalytic reduction system 15. Control module 205 includes programming required to process inputs related to the passive selective catalytic reduction system 15 and can include programming to employ methods described herein.

Engine operation is controlled by the control module 5 to operate at one of the lean and rich AFR combustion states. The control module 5 is signally connected to control module 205 to receive information about the exhaust gas constituents. The control module 5 can control engine operation between the lean AFR combustion state and the rich AFR combustion state based on the type of exhaust gas constituents, the concentration of one or all of the exhaust gas constituents, or other control schemes, such time of operation in a particular mode.

During engine operation, the engine 10 is started thereby causing each cylinder to proceed through the combustion cycles to produce torque. Each exhaust stroke pumps exhaust to the passive selective catalytic reduction system 15. Start-up engine operation includes operating in the lean AFR combustion state to precondition the TWC 210 and the SCR 220. Preconditioning the TWC 210 and the SCR 220 causes the TWC 210 and the SCR 220 to achieve operating temperatures conducive to respective catalytic functions. In the case of the SCR 220, preconditioning also removes any remaining $NH_3$ from the SCR 220. Upon completion of preconditioning, the engine 10 is operated in rich AFR combustion state thereby producing exhaust gas constituents, including HC, CO, $H_2O$, and NOx, and converting them in the TWC 210 to CO, $H_2O$, and $NH_3$. The sensors at the upstream position 230 detect the exhaust gas constituents related to the sensor type, i.e., either NH3 or NOx, in the exhaust gas feedstream and sends the information to the control module 205. The control module 205 can then determine a concentration of other exhaust gas constituents, i.e., NH3 or NOx, upstream of the SCR 220. The NH3 is stored within the SCR 220 for later use during the lean AFR combustion state and constituents CO and H2O are passed through.

Likewise, the sensors located at the mid-brick position 240 and the downstream position 250 detect exhaust gas constituents corresponding to the selected one of the NH3 sensor 330 and the NOx sensor 335, i.e., either NH3 or NOx, in and aft of the SCR 220 respectively, and sends the information to the control module 205. The control module 205 can determine the concentration of NH3 at each sensor location to determine if the SCR 220 has collected a predetermined concentration of NH3 or has become saturated with NH3. Upon reaching the predetermined concentration of NH3, the control module 205 commands the engine 10 to start operation in the lean AFR combustion state.

Operation of the engine 10 in the lean AFR combustion state results in producing exhaust gas constituents and converting them to CO2 and H2O after the TWC 210. During operation in the lean AFR combustion state, a majority of NOx is unchanged in the TWC 210. The SCR 220 allows the CO2 and the H2O to pass through and be expelled through the exhaust system. The NOx molecules react with the NH3 deposited within the SCR 220 to form N2 and H2O molecules which flow through the remaining exhaust system. The NH3 sensor 330 and the NOx sensor 335 located at the mid-brick and the downstream positions 240 and 250 detect when the NH3 deposited on the SCR 220 has reduced to a predetermined depleted level and request the engine 10 to enter rich AFR combustion state to increase the NH3 deposits on the SCR 220. Alternatively, the engine 10 can be cyclically switched between lean and rich AFR combustion states based on other criteria, including a predetermined amount of time expiring or calculated from time of operation within various engine operating states.

The NH3 sensor 330 and the NOx sensor 335 located at the upstream, mid-brick, and downstream positions 230, 240, and 250 respectively, can be used to detect and monitor the effectiveness of the TWC 210 and the SCR 220. The effectiveness either of the TWC 210 and the SCR 220 is compromised by several means including falling outside of the operating temperature range, introduction of an obstruction, and introduction of contaminants. When the effectiveness of the TWC 210 and the SCR 220 become compromised, the reduced effectiveness can be gradual resulting in operation that can be described as one of working satisfactorily, marginally, and inadequately. TWC 210 and SCR 220 are considered to be working adequately when they are efficiently operating to reduce or oxidize the exhaust gas constituents to inert gases. The TWC 210 and SCR 220 are considered to be working marginally when they are operating the below the satisfactory effective level wherein the efficiency of the TWC 210 and SCR 220 have been compromised thereby allowing a portion of exhaust gas constituents to pass through the TWC 210 or the SCR 220 untreated. The TWC 210 and SCR 220 are considered to be working inadequately when they are operating below the marginally effective level and the efficiency of the TWC 210 and SCR 220 permit a substantial portion of the exhaust gas constituents to pass through the TWC 210 or SCR 220 untreated. It is appreciated that the terms of satisfactory, marginal, and inadequate are associated with regulated emissions levels and corresponding conversion efficiency levels for a specific embodiment and may correspond to predetermined settings.

Figure 3:
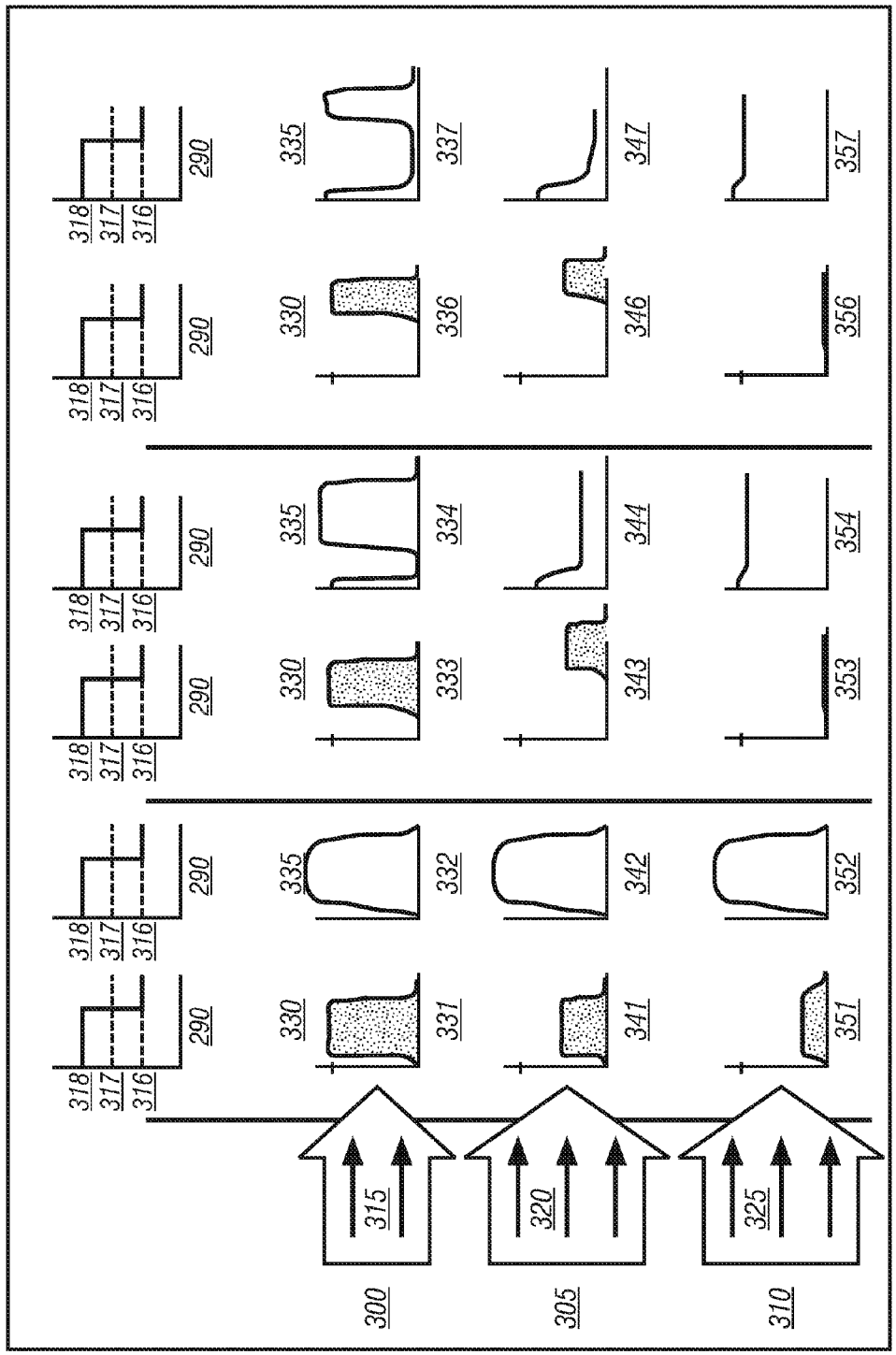
FIG. 3 depicts expected emissions graphs at the upstream, mid-brick, and downstream sensors during a satisfactorily working SCR when the TWC is in various states of effectiveness including satisfactory, marginal, and inadequate and comparing detection with an NH3 sensor and NOx sensor, in accordance with the present disclosure.

FIG. 3 depicts graphical representations of expected signal outputs from the NH3 sensor 330 and the NOx sensor 335 when located at the upstream, mid-brick, and downstream positions 230, 240, and 250, respectively, with a satisfactorily working SCR 220 when the TWC 210 is in various states of effectiveness including satisfactory effectiveness 300, marginal effectiveness 305, and inadequate effectiveness 310 in response to a commanded switch from the lean AFR combustion state 316 to the rich AFR combustion state 318 and back to the lean AFR combustion state 316 (i.e. rich air/fuel excursion). The combustion state transition is depicted in graph 290 wherein the initial switch from lean AFR combustion state 316 to rich AFR combustion state 318 is concurrent with the vertical axis. The engine 10 is operated in the rich AFR combustion state 318 until commanded to switch to the lean AFR combustion state 316 by the control module 5. The remaining graphs depict signal outputs from the NH3 sensor 330 and the NOx sensor 335 at each of the upstream, mid-brick, and downstream positions 230, 240, and 250 during TWC operating states of satisfactory effectiveness 300, marginal effectiveness 305, and inadequate effectiveness 310.

Graph 331 depicts a signal output from the NH3 sensor 330 located at the upstream position 230 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working satisfactorily. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NH3 sensor 330. After a dwell period, the engine 10 switches from rich to lean AFR combustion state 318, 316, respectively, and the rate of NH3 production decreases, as indicated by the NH3 sensor 330.

Graph 332 depicts a signal output from the NOx sensor 335 located at the upstream position 230 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working satisfactorily. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. After a dwell period, the engine 10 switches from rich to lean AFR combustion state 318, 316, respectively, and the rate of NH3 production decreases, as indicated by the NOx sensor 335.

Graph 333 depicts a signal output from the NH3 sensor 330 located at the mid-brick position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working satisfactorily. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NH3 sensor 330 detects the NH3 component of the satisfactory TWC gas emissions 315 after a positionally induced time delay. The positionally induced time delay occurs due to the further downstream position of the NH3 sensor 330 and the absorption of the NH3 within the SCR 220 before reaching the mid-brick position 240. After a dwell period, the engine 10 switches from rich to lean AFR combustion state 318, 316, respectively, and the rate of NH3 production decreases, as indicated by the NH3 sensor 330.

Graph 334 depicts a signal output from the NOx sensor 335 located at the mid-brick position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working satisfactorily. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. The NOx sensor 335 detects a residual amount of NH3 after the switch from lean AFR combustion state 316 to rich AFR combustion state 318 due to a positionally induced time delay associated with the mid-brick 240 position. The NOx sensor 335 detects the NH3 component of the satisfactory TWC gas emissions 315 after a positionally induced time delay, i.e., due to the mid-brick 240 position of the NOx sensor 335 and absorption of the NH3 within the SCR 220. After a dwell period, the engine 10 switches from rich to lean AFR combustion state 318, 316, respectively, and the rate of NH3 production decreases, as indicated by the NOx sensor 335.

Graph 336 depicts a signal output from the NH3 sensor 330 located at the downstream position 250 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working satisfactorily. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NH3 sensor 330 detects the NH3 component of the satisfactory TWC gas emissions 315 after a positionally induced time delay. The positionally induced time delay occurs due to the downstream position 250 and the absorption of the NH3 within the SCR 220 before reaching the downstream position 250. After a dwell period, the engine 10 switches from rich to lean AFR combustion state 318, 316, respectively, and the rate of NH3 production decreases, as indicated by the NH3 sensor 330.

Graph 337 depicts a signal output from the NOx sensor 335 located at the downstream position 250 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working satisfactorily. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. The NOx sensor 335 detects a residual amount of NH3 after the switch from lean AFR combustion state 316 to rich AFR combustion state 318 due to a positionally induced time delay, i.e., further downstream position. The NOx sensor 335 detects the NH3 component of the satisfactory TWC gas emissions 315 after a positionally induced time delay, i.e., due to the downstream position 250 and absorption of the NH3 within the SCR 220. After a dwell period, the engine 10 switches from rich to lean AFR combustion state 318, 316, respectively, and the rate of NH3 production decreases, as indicated by the NOx sensor 335.

Graph 341 depicts a signal output from the NH3 sensor 330 located at the upstream position 230 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working satisfactorily. When the TWC 210 is operating at marginal effectiveness 305 during rich AFR combustion state 318, the TWC 210 converts the exhaust gas constituents to marginal TWC gas emissions 320 including CO, H2O, NH3, and NOx. Since the TWC 210 is operating marginally, NOx is passing through unconverted to NH3 within the TWC 210. The NH3 that is being converted is detected by the NH3 sensor 330. After a dwell period, the engine 10 switches from rich to lean AFR combustion state 318, 316, respectively, and the rate of NH3 production decreases, as indicated by the NH3 sensor 330.

Graph 342 depicts a signal output from the NOx sensor 335 located at the upstream position 230 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working satisfactorily. When the TWC 210 is operating marginal effectiveness 305 during rich AFR combustion state 318, the TWC 210 converts the exhaust gas constituents to marginal TWC gas emissions 315 including CO, H2O, NH3, and NOx. The NOx sensor 335 detects both the NH3 and NOx produced and therefore, is similar to graph 332. After a dwell period, the engine 10 switches from rich to lean AFR combustion state 318, 316, respectively, and the rate of NH3 production decreases, as indicated by the NOx sensor 335.

Graph 343 depicts a signal output from the NH3 sensor 330 located at the mid-brick position 240 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working satisfactorily. When the TWC 210 is operating marginal effectiveness 305 during rich AFR combustion state 318, the TWC 210 converts the exhaust gas constituents to marginal TWC gas emissions 320 including CO, H2O, NH3, and NOx. The NH3 sensor 330 detects the NH3 component of the marginal TWC gas emissions 320 after a positionally induced time delay. The positionally induced time delay occurs due to the further downstream position of the NH3 sensor 330 and the absorption of the NH3 within the SCR 220 before reaching the mid-brick position 240. The time delay is longer than graph 333 due to less production of NH3 and the absorption of the NH3 within the SCR 220 before reaching the NH3 sensor 330. After a dwell period, the engine 10 switches from rich to lean AFR combustion state 318, 316, respectively, and the rate of NH3 production decreases, as indicated by the NH3 sensor 330.

Graph 344 depicts a signal output from the NOx sensor 335 located at the mid-brick position 240 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working satisfactorily. When the TWC 210 is operating marginal effectiveness 305 during rich AFR combustion state 318, the TWC 210 converts the exhaust gas constituents to marginal TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay. The NOx sensor 335 detects the residual NOx component of the marginal TWC gas emissions 320 and continues detection of NOx even through the commanded switch from the rich AFR combustion state 318 to the lean AFR combustion state 316.

Graph 346 depicts a signal output from the NH3 sensor 330 located at the downstream position 250 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working satisfactorily. When the TWC 210 is operating marginal effectiveness 305 during rich AFR combustion state 318, the TWC 210 converts the exhaust gas constituents to marginal TWC gas emissions 315 including CO, H2O, NH3, and NOx. The NH3 sensor 330 detects the NH3 component of the marginal TWC gas emissions 315 after a positionally induced time delay. The positionally induced time delay occurs due to the further downstream position of the NH3 sensor 330 and the absorption of the NH3 within the SCR 220 before reaching the downstream position 250. The positionally induced time delay is longer than in graph 336 due to less NH3 being produced and the SCR 220 absorbing the NH3 produced. After a dwell period, the engine 10 switches from rich to lean AFR combustion state 318, 316, respectively, and the rate of NH3 production decreases, as indicated by the NH3 sensor 330.

Graph 347 depicts a signal output from the NOx sensor 335 located at the downstream position 250 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working satisfactorily. When the TWC 210 is operating marginal effectiveness 305 during rich AFR combustion state 318, the TWC 210 converts the exhaust gas constituents to marginal TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream than the mid-brick position 240. The NOx sensor 335 detects the residual NOx component of the marginal TWC gas emissions 320 and continues detection of NOx even through the commanded switch from the rich AFR combustion state 318 to the lean AFR combustion state 316.

Graph 351 depicts a signal output from the NH3 sensor 330 located at the upstream position 230 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working satisfactorily. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. Since the TWC 210 is operating marginally, less NH3 is produced and more NOx is passing through unconverted to NH3 within the TWC 210 than in the marginally operating TWC 205. The NH3 that is being converted is detected by the NH3 sensor 330. After a dwell period, the engine 10 switches from rich to lean AFR combustion state 318, 316, respectively, and the rate of NH3 production decreases, as indicated by the NH3 sensor 330.

Graph 352 depicts a signal output from the NOx sensor 335 located at the upstream position 230 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working satisfactorily. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NOx sensor 335 detects both the NH3 and NOx produced and therefore, is similar to graph 342. After a dwell period, the engine 10 switches from rich to lean AFR combustion state 318, 316, respectively, and the rate of NH3 production decreases, as indicated by the NOx sensor 335.

Graph 353 depicts a signal output from the NH3 sensor 330 located at the mid-brick position 240 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working satisfactorily. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NH3 sensor 330 detects the NH3 component of the inadequate TWC gas emissions 325, which is a trace amount. The NH3 sensor 330 maintains the detection of trace amounts for duration of detection.

Graph 354 depicts a signal output from the NOx sensor 335 located at the mid-brick position 240 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working satisfactorily. When the TWC 210 is operating at inadequate effectiveness 310 during rich AFR combustion state 318, the TWC 210 converts the exhaust gas constituents to inadequate TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 356 depicts a signal output from the NH3 sensor 330 located at the downstream position 250 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working satisfactorily. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NH3 sensor 330 detects the NH3 component of the inadequate TWC gas emissions 325, which is a trace amount. The NH3 sensor 330 maintains the detection of trace amounts for duration of detection.

Graph 357 depicts a signal output from the NOx sensor 335 located at the downstream position 250 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working satisfactorily. When the TWC 210 is operating at inadequate effectiveness 310 during rich AFR combustion state 318, the TWC 210 converts the exhaust gas constituents to inadequate TWC gas emissions 325 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 325 and continues detection of NOx even through the commanded switch from the rich AFR combustion state 318 to the lean AFR combustion state 316.

Figure 4:
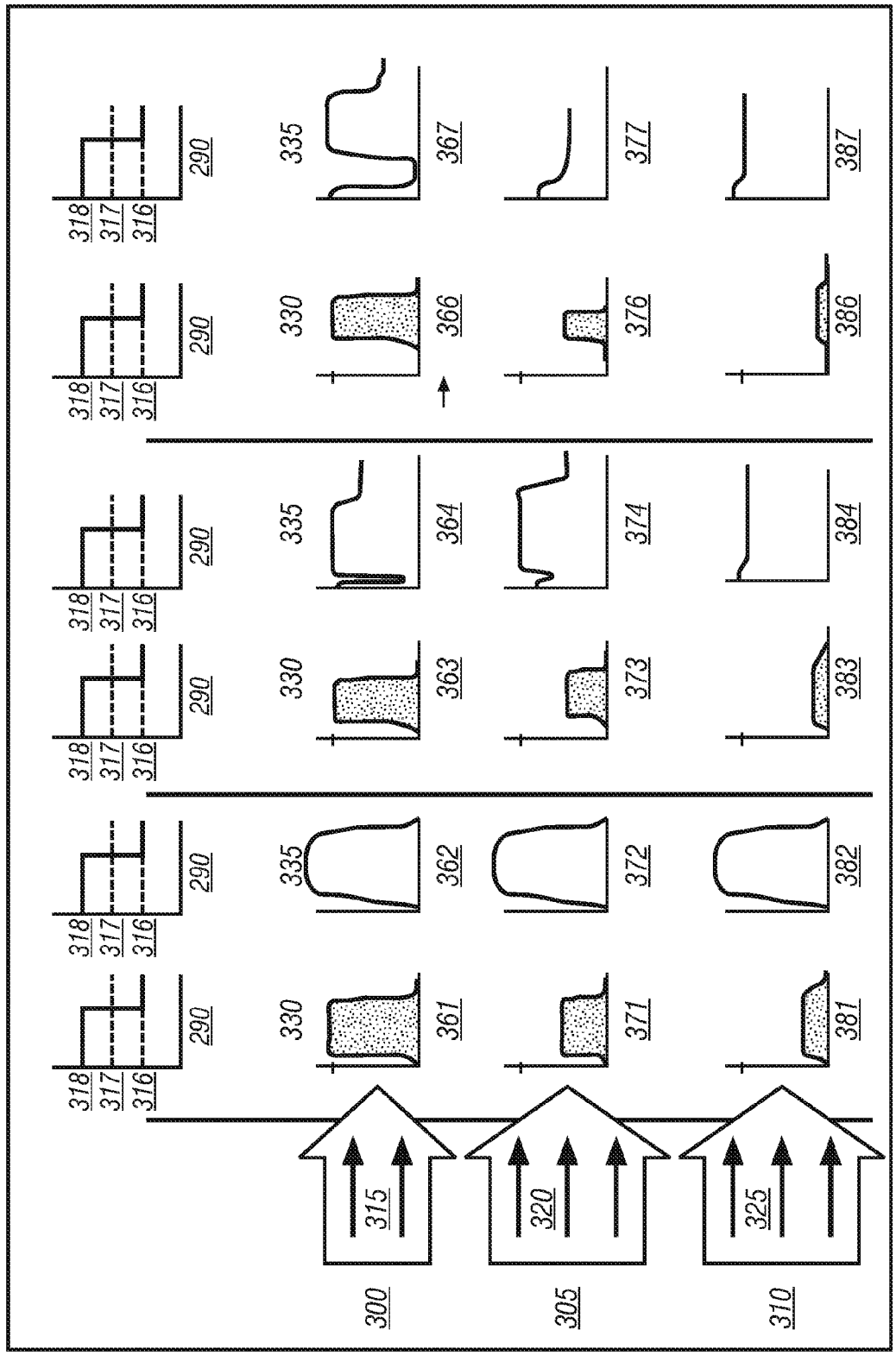
FIG. 4 depicts expected emissions graphs at the upstream, mid-brick, and downstream sensors during a marginally working SCR when the TWC is in various states of effectiveness including satisfactory, marginal, and inadequate, and displaying detection of an NH3 sensor and NOx sensor, in accordance with the present disclosure.

FIG. 4 depicts graphical representations of expected signal outputs from the NH3 sensor 330 and the NOx sensor 335 when located at the upstream, mid-brick, and downstream positions 230, 240, and 250, respectively, with a marginally working SCR 220 when the TWC 210 is in various states of effectiveness including satisfactory effectiveness 300, marginal effectiveness 305, and inadequate effectiveness 310 in response to a commanded switch from the lean AFR combustion state 316 to the rich AFR combustion state 318 and back to the lean AFR combustion state 316 (i.e. rich air/fuel excursion). The combustion state transition is depicted in graph 290 wherein the initial switch from lean AFR combustion state 316 to rich AFR combustion state 318 is concurrent with the vertical axis. The engine 10 is operated in the rich AFR combustion state 318 until commanded to switch to the lean AFR combustion state 316 by the control module 5. The remaining graphs depict signal outputs from the NH3 sensor 330 and the NOx sensor 335 at each of the upstream, mid-brick, and downstream positions 230, 240, and 250 during TWC operating states of satisfactory effectiveness 300, marginal effectiveness 305, and inadequate effectiveness 310.

Graph 361 depicts a signal output from the NH3 sensor 330 located at the upstream position 230 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working marginally. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NH3 sensor 330. After a dwell period, the engine 10 switches from rich to lean AFR combustion state 318, 316, respectively, and the rate of NH3 production decreases, as indicated by the NH3 sensor 330.

Graph 362 depicts a signal output from the NOx sensor 335 located at the upstream position 230 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working marginally. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. After a dwell period, the engine 10 switches from rich to lean AFR combustion state 318, 316, respectively, and the rate of NH3 production decreases, as indicated by the NOx sensor 335.

Graph 363 depicts a signal output from the NH3 sensor 330 located at the mid-brick position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working marginally. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NH3 sensor 330 detects the NH3 component of the satisfactory TWC gas emissions 315 after a positionally induced time delay. The positionally induced time delay occurs due to the further downstream position of the NH3 sensor 330 and the absorption of the NH3 within the SCR 220 before reaching the mid-brick position 240. Since the SCR 220 is working marginally, the detection period is longer than of graph 333 due to the SCR 220 absorbing less NH3 than is being produced. After a dwell period, the engine 10 switches from rich to lean AFR combustion state 318, 316, respectively, and the rate of NH3 production decreases, as indicated by the NH3 sensor 330.

Graph 364 depicts a signal output from the NOx sensor 335 located at the mid-brick position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working marginally. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. The NOx sensor 335 continues detecting an amount of NH3 after the switch from lean AFR combustion state 316 to rich AFR combustion state 318 during a positionally induced time delay, i.e., mid-brick 240 position, due to the residual NH3 escaping from the SCR 220. The NOx sensor 335 then immediately begins detecting the NH3 component of the satisfactory TWC gas emissions 315 due to little absorption of the NH3 within the SCR 220. After a dwell period, the engine 10 switches from rich to lean AFR combustion state 318, 316, respectively, and the rate of NH3 production decreases, as indicated by the NOx sensor 335, to a detection point of escaping NH3 from the surface of the SCR 220.

Graph 366 depicts a signal output from the NH3 sensor 330 located at the downstream position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working marginally. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NH3 sensor 330 detects the NH3 component of the satisfactory TWC gas emissions 315 after a positionally induced time delay. The positionally induced time delay occurs due to the downstream position 250 and the absorption of the NH3 within the SCR 220 before reaching the downstream position 250. After a dwell period, the engine 10 switches from rich to lean AFR combustion state 318, 316, respectively, and the rate of NH3 production decreases, as indicated by the NH3 sensor 330.

Graph 367 depicts a signal output from the NOx sensor 335 located at the downstream position 250 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working marginally. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NOx sensor 335 detects a residual amount of NH3 after the switch from lean AFR combustion state 316 to rich AFR combustion state 318 during a positionally induced time delay, i.e., further downstream position. The NOx sensor 335 detects the residual NH3 as some escapes from the SCR 220 and then immediately begins detecting the NH3 component of the satisfactory TWC gas emissions 315 due to little absorption of the NH3 within the SCR 220. After a dwell period, the engine 10 switches from rich to lean AFR combustion state 318, 316, respectively, and the rate of NH3 production decreases, as indicated by the NOx sensor 335, to a detection point of escaping NH3 from the surface of the SCR 220.

Graph 371 depicts a signal output from the NH3 sensor 330 located at the upstream position 230 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working marginally. When the TWC 210 is operating at marginal effectiveness 305 during rich AFR combustion state 318, the TWC 210 converts the exhaust gas constituents to marginal TWC gas emissions 320 including CO, H2O, NH3, and NOx. Since the TWC 210 is operating marginally, less NH3 is produced and more NOx is passing through unconverted to NH3 within the TWC 210. The NH3 that is being converted is detected by the NH3 sensor 330. After a dwell period, the engine 10 switches from rich to lean AFR combustion state 318, 316, respectively, and the rate of NH3 production decreases, as indicated by the NH3 sensor 330.

Graph 372 depicts a signal output from the NOx sensor 335 located at the upstream position 230 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working marginally. When the TWC 210 is operating marginally effectiveness 305 during rich AFR combustion state 318, the TWC 210 converts the exhaust gas constituents to marginal TWC gas emissions 315 including CO, H2O, NH3, and NOx. The NOx sensor 335 detects both the NH3 and NOx produced and therefore, is similar to graph 362. After a dwell period, the engine 10 switches from rich to lean AFR combustion state 318, 316, respectively, and the rate of NH3 production decreases, as indicated by the NOx sensor 335.

Graph 373 depicts a signal output from the NH3 sensor 330 located at the mid-brick position 240 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working marginally. When the TWC 210 is operating at marginal effectiveness 305 during rich AFR combustion state 318, the TWC 210 converts the exhaust gas constituents to marginal TWC gas emissions 320 including CO, H2O, NH3, and NOx. Since the TWC is operating at marginal effectiveness 305, less NOx is being converted to NH3. The NH3 sensor 330 detects the NH3 component of the marginal TWC gas emissions 320 after a positionally induced time delay. The positionally induced time delay occurs due to the further downstream position of the NH3 sensor 330 and the absorption of the NH3 within the SCR 220 before reaching the mid-brick position 240. The time delay is longer than graph 363 due to less production of NH3 and the absorption of the NH3 within the SCR 220 before reaching the NH3 sensor 330. After a dwell period, the engine 10 switches from rich to lean AFR combustion state 318, 316, respectively, and the rate of NH3 production decreases, as indicated by the NH3 sensor 330.

Graph 374 depicts a signal output from the NOx sensor 335 located at the mid-brick position 240 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working marginally. When the TWC 210 is operating at marginal effectiveness 305 during rich AFR combustion state 318, the TWC 210 converts the exhaust gas constituents to marginal TWC gas emissions 320 including CO, H2O, NH3, and NOx, which both the NH3 and NOx is detected by the NOx sensor 335. The NOx sensor 335 detects a residual amount of NOx after the switch from lean AFR combustion state 316 to rich AFR combustion state 318 due to a positionally induced time delay, i.e., further downstream position than graph 372. The NOx sensor 335 detects the residual NOx component and the NH3 component of the marginal TWC gas emissions 320 and continues at a high level of detection for both the NOx and NH3 components. The commanded switch from the rich AFR combustion state 318 to the lean AFR combustion state 316 causes a NH3 to stop being produced and therefore only NOx is detected after the commanded switch from the rich AFR combustion state 318 to the lean AFR combustion state 316.

Graph 376 depicts a signal output from the NH3 sensor 330 located at the downstream position 250 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working marginally. When the TWC 210 is operating at marginal effectiveness 305 during rich AFR combustion state 318, the TWC 210 converts the exhaust gas constituents to marginal TWC gas emissions 315 including CO, H2O, NH3, and NOx. The NH3 sensor 330 detects the NH3 component of the marginal TWC gas emissions 315 after a positionally induced time delay. The positionally induced time delay occurs due to the further downstream position of the NH3 sensor 330 and the absorption of the NH3 within the SCR 220 before reaching the downstream position 250. The positionally induced time delay is longer than in graph 366 due to less NH3 being produced and the SCR 220 absorbing NH3 produced. After a dwell period, the engine 10 switches from rich to lean AFR combustion state 318, 316, respectively, and the rate of NH3 production decreases, as indicated by the NH3 sensor 330.

Graph 377 depicts a signal output from the NOx sensor 335 located at the downstream position 250 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working marginally. When the TWC 210 is operating at marginal effectiveness 305 during the rich AFR combustion state 318, the TWC 210 converts the exhaust gas constituents to marginal TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream than the midbrick position 240. The NOx sensor 335 detects the residual NOx component of the marginal TWC gas emissions 320 and continues detection of NOx after the commanded switch from the rich AFR combustion state 318 to the lean AFR combustion state 316.

Graph 381 depicts a signal output from the NH3 sensor 330 located at the upstream position 230 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working marginally. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. Since the TWC 210 is operating inadequately, less NH3 is being produced and a greater amount of NOx is passing through unconverted to NH3 within the TWC 210 than in the marginally operating TWC 205. The NH3 that is being converted is detected by the NH3 sensor 330. After a dwell period, the engine 10 switches from rich to lean AFR combustion state 318, 316, respectively, and the rate of NH3 production decreases, as indicated by the NH3 sensor 330.

Graph 382 depicts a signal output from the NOx sensor 335 located at the upstream position 230 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working marginally. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NOx sensor 335 detects both the NH3 and NOx produced and therefore, is similar to graph 342. After a dwell period, the engine 10 switches from rich to lean AFR combustion state 318, 316, respectively, and the rate of NH3 production decreases, as indicated by the NOx sensor 335.

Graph 383 depicts a signal output from the NH3 sensor 330 located at the mid-brick position 240 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working marginally. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NH3 sensor 330 detects the NH3 component of the inadequate TWC gas emissions 325, which is a low amount. The NH3 sensor 330 maintains the detection of low amounts until the NH3 is no longer produced.

Graph 384 depicts a signal output from the NOx sensor 335 located at the mid-brick position 240 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working marginally. When the TWC 210 is operating at inadequate effectiveness 310 during rich AFR combustion state 318, the TWC 210 converts the exhaust gas constituents to inadequate TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 386 depicts a signal output from the NH3 sensor 330 located at the downstream position 250 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working marginally. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NH3 sensor 330 detects the NH3 component of the inadequate TWC gas emissions 325, which is a low amount. The NH3 sensor 330 maintains the detection of low amounts until the NH3 is no longer produced.

Graph 387 depicts a signal output from the NOx sensor 335 located at the downstream position 250 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working marginally. When the TWC 210 is operating at inadequate effectiveness 310 during rich AFR combustion state 318, the TWC 210 converts the exhaust gas constituents to inadequate TWC gas emissions 325 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 325 and continues detection of NOx even through the commanded switch from the rich AFR combustion state 318 to the lean AFR combustion state 316.

Figure 5:
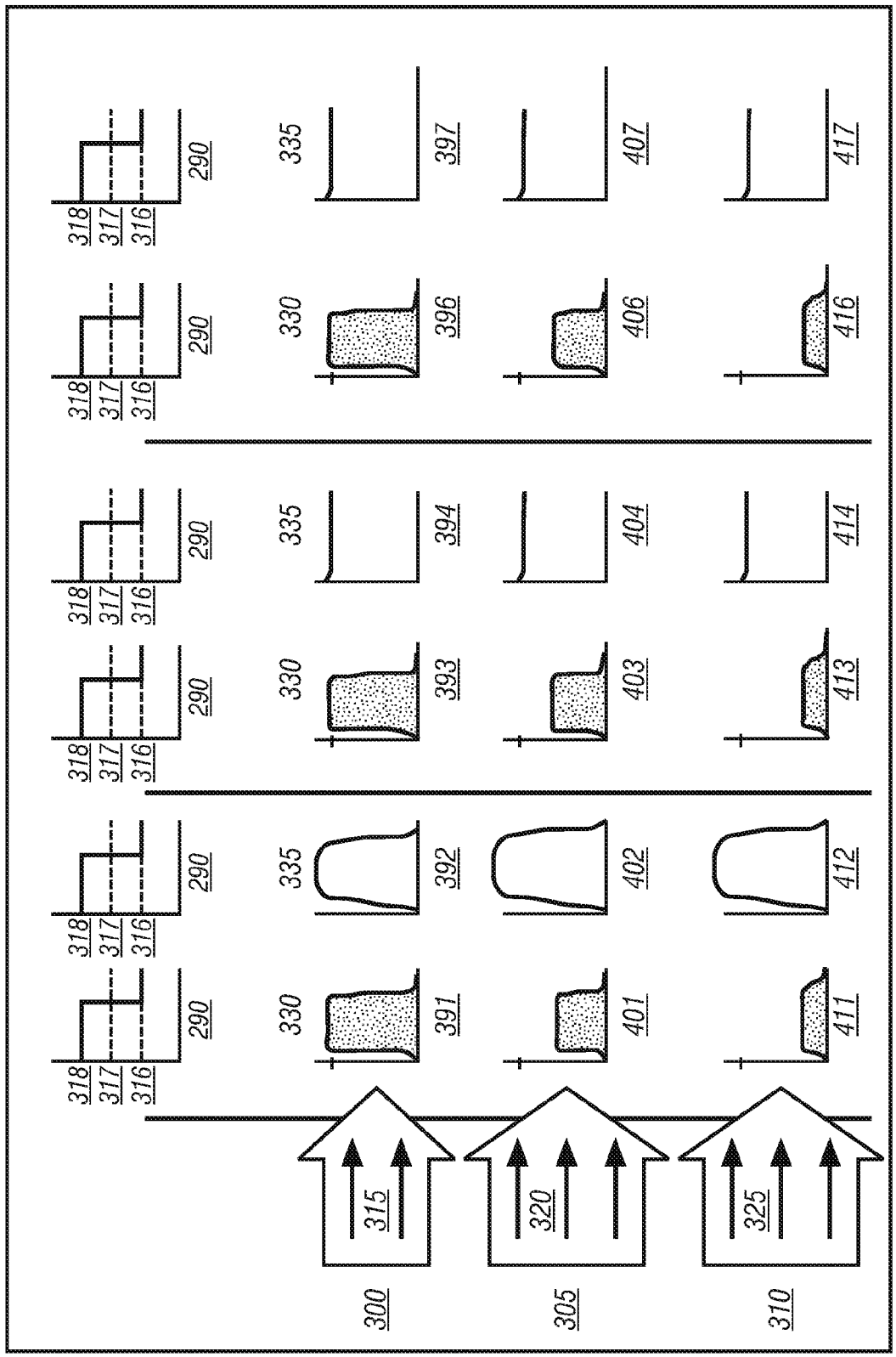
FIG. 5 depicts expected emissions graphs at the upstream, mid-brick, and downstream sensors during an inadequately working SCR when the TWC is in various states of effectiveness including satisfactory, marginal, and inadequate and displaying detection of an NH3 sensor and NOx sensor, in accordance with the present disclosure.

FIG. 5 depicts graphical representations of expected signal outputs from the NH3 sensor 330 and the NOx sensor 335 when located at the upstream, mid-brick, and downstream positions 230, 240, and 250, respectively, with a inadequately working SCR 220 when the TWC 210 is in various states of effectiveness including satisfactory effectiveness 300, marginal effectiveness 305, and inadequate effectiveness 310 in response to a commanded switch from the lean AFR combustion state 316 to the rich AFR combustion state 318 and back to the lean AFR combustion state 316 (i.e. rich air/fuel excursion). The combustion state transition is depicted in graph 290 wherein the initial switch from lean AFR combustion state 316 to rich AFR combustion state 318 is concurrent with the vertical axis. The engine 10 is operated in the rich AFR combustion state 318 until commanded to switch to the lean AFR combustion state 316 by the control module 5. The remaining graphs depict signal outputs from the NH3 sensor 330 and the NOx sensor 335 at each of the upstream, mid-brick, and downstream positions 230, 240, and 250 during TWC operating states of satisfactory effectiveness 300, marginal effectiveness 305, and inadequate effectiveness 310.

Graph 391 depicts a signal output from the NH3 sensor 330 located at the upstream position 230 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working inadequately. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NH3 sensor 330. After a dwell period, the engine 10 switches from rich to lean AFR combustion state 318, 316, respectively, and the rate of NH3 production decreases, as indicated by the NH3 sensor 330.

Graph 392 depicts a signal output from the NOx sensor 335 located at the upstream position 230 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working inadequately. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. After a dwell period, the engine 10 switches from rich to lean AFR combustion state 318, 316, respectively, and the rate of NH3 production decreases, as indicated by the NOx sensor 335.

Graph 393 depicts a signal output from the NH3 sensor 330 located at the mid-brick position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working inadequately. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NH3 sensor 330 detects the NH3 component of the satisfactory TWC gas emissions 315 after a positionally induced time delay. The positionally induced time delay occurs due to the further downstream position of the NH3 sensor 330 and the absorption of the NH3 within the SCR 220 before reaching the mid-brick position 240. Since the SCR 220 is working inadequately, the detection period begins sooner and is longer than of graph 333 due to the SCR 220 absorbing less NH3 than is being produced. After a dwell period, the engine 10 switches from rich to lean AFR combustion state 318, 316, respectively, and the rate of NH3 production decreases, as indicated by the NH3 sensor 330.

Graph 394 depicts a signal output from the NOx sensor 335 located at the mid-brick position 240 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working inadequately. When the TWC 210 is operating at satisfactory effectiveness 300 during rich AFR combustion state 318, the TWC 210 converts the exhaust gas constituents to satisfactory TWC gas emissions 315 including CO, H2O, and NH3, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 396 depicts a signal output from the NH3 sensor 330 located at the downstream position 250 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working inadequately. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NH3 sensor 330 detects the NH3 component of the satisfactory TWC gas emissions 315 after a positionally induced time delay. The positionally induced time delay occurs due to the downstream position 250 and the absorption of the NH3 within the SCR 220 before reaching the downstream position 250. After a dwell period, the engine 10 switches from rich to lean AFR combustion state 318, 316, respectively, and the rate of NH3 production decreases, as indicated by the NH3 sensor 330.

Graph 397 depicts a signal output from the NOx sensor 335 located at the downstream position 250 with the TWC 210 operating at satisfactory effectiveness 300 to convert the exhaust gas constituents to satisfactory TWC gas emissions 315 in response to the commanded switch from the lean AFR combustion state 316 to the rich AFR combustion state 318 and back to the lean AFR combustion state 316. As depicted, the SCR 220 is working inadequately. When the TWC 210 is operating at satisfactory effectiveness 300 during rich AFR combustion state 318, the TWC 210 converts the exhaust gas constituents to satisfactory TWC gas emissions 315 including CO, H2O, and NH3. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 401 depicts a signal output from the NH3 sensor 330 located at the upstream position 230 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working inadequately. When the TWC 210 is operating at marginal effectiveness 305 during rich AFR combustion state 318, the TWC 210 converts the exhaust gas constituents to marginal TWC gas emissions 320 including CO, H2O, NH3, and NOx. Since the TWC 210 is operating marginally, NOx is passing through unconverted to NH3 within the TWC 210. The NH3 that is being converted is detected by the NH3 sensor 330. After a dwell period, the engine 10 switches from rich to lean AFR combustion state 318, 316, respectively, and the rate of NH3 production decreases, as indicated by the NH3 sensor 330.

Graph 402 depicts a signal output from the NOx sensor 335 located at the upstream position 230 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working inadequately. When the TWC 210 is operating at marginal effectiveness 305 during rich AFR combustion state 318, the TWC 210 converts the exhaust gas constituents to marginal TWC gas emissions 315 including CO, H2O, NH3, and NOx. The NOx sensor 335 detects both the NH3 and NOx produced and therefore, is similar to graph 362. After a dwell period, the engine 10 switches from rich to lean AFR combustion state 318, 316, respectively, and the rate of NH3 production decreases, as indicated by the NOx sensor 335.

Graph 403 depicts a signal output from the NH3 sensor 330 located at the mid-brick position 240 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working inadequately. When the TWC 210 is operating marginally 305 during rich AFR combustion state 318, the TWC 210 converts the exhaust gas constituents to marginal TWC gas emissions 320 including CO, H2O, NH3, and NOx. The NH3 sensor 330 detects the NH3 component of the marginal TWC gas emissions 320 after a positionally induced time delay. The positionally induced time delay occurs due to the further downstream position of the NH3 sensor 330 and the absorption of the NH3 within the SCR 220 before reaching the mid-brick position 240. The time delay is longer than graph 363 due to less production of NH3 and the absorption of the NH3 within the SCR 220 before reaching the NH3 sensor 330. After a dwell period, the engine 10 switches from rich to lean AFR combustion state 318, 316, respectively, and the rate of NH3 production decreases, as indicated by the NH3 sensor 330.

Graph 404 depicts a signal output from the NOx sensor 335 located at the mid-brick position 240 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working inadequately. When the TWC 210 is operating at marginal effectiveness 305 during rich AFR combustion state 318, the TWC 210 converts the exhaust gas constituents to marginal TWC gas emissions 320 including CO, H2O, NH3, and NOx, which both the NH3 and NOx is detected by the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 406 depicts a signal output from the NH3 sensor 330 located at the downstream position 250 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working inadequately. When the TWC 210 is operating at marginal effectiveness 305 during rich AFR combustion state 318, the TWC 210 converts the exhaust gas constituents to marginal TWC gas emissions 315 including CO, H2O, NH3, and NOx. The NH3 sensor 330 detects the NH3 component of the marginal TWC gas emissions 315 after a positionally induced time delay. The positionally induced time delay occurs due to the further downstream position of the NH3 sensor 330 and the absorption of the NH3 within the SCR 220 before reaching the downstream position 250. The positionally induced time delay is longer than in graph 366 due to less NH3 being produced and the SCR 220 absorbing NH3 produced. After a dwell period, the engine 10 switches from rich to lean AFR combustion state 318, 316, respectively, and the rate of NH3 production decreases, as indicated by the NH3 sensor 330.

Graph 407 depicts a signal output from the NOx sensor 335 located at the downstream position 250 with the TWC 210 operating at marginal effectiveness 305 to convert the exhaust gas constituents to marginal TWC gas emissions 320 in response to the commanded switch from the lean AFR combustion state 316 to the rich AFR combustion state 318 and back to the lean AFR combustion state 316. As depicted, the SCR 220 is working inadequately. When the TWC 210 is operating at marginal effectiveness 305 during the rich AFR combustion state 318, the TWC 210 converts the exhaust gas constituents to marginal TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 411 depicts a signal output from the NH3 sensor 330 located at the upstream position 230 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working inadequately. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. Since the TWC 210 is operating inadequately, a greater amount of NOx is passing through unconverted to NH3 within the TWC 210 than in the marginally operating TWC 205. The NH3 that is being converted is detected by the NH3 sensor 330. After a dwell period, the engine 10 switches from rich to lean AFR combustion state 318, 316, respectively, and the rate of NH3 production decreases, as indicated by the NH3 sensor 330.

Graph 412 depicts a signal output from the NOx sensor 335 located at the upstream position 230 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working inadequately. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NOx sensor 335 detects both the NH3 and NOx produced and therefore, is similar to graph 342. After a dwell period, the engine 10 switches from rich to lean AFR combustion state 318, 316, respectively, and the rate of NH3 production decreases, as indicated by the NOx sensor 335.

Graph 413 depicts a signal output from the NH3 sensor 330 located at the mid-brick position 240 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working inadequately. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NH3 sensor 330 detects the NH3 component of the inadequate TWC gas emissions 325, which is a low amount. The NH3 sensor 330 maintains the detection of low amounts until the NH3 is no longer produced.

Graph 414 depicts a signal output from the NOx sensor 335 located at the mid-brick position 240 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working inadequately. When the TWC 210 is operating at inadequate effectiveness 310 during rich AFR combustion state 318, the TWC 210 converts the exhaust gas constituents to inadequate TWC gas emissions 320 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 320 and continues detection of NOx even through the commanded switch from the rich AFR combustion state 318 to the lean AFR combustion state 316.

Graph 416 depicts a signal output from the NH3 sensor 330 located at the downstream position 250 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working inadequately. When the TWC 210 is operating at inadequate effectiveness 310 during rich AFR combustion state 318, the TWC 210 converts the exhaust gas constituents to inadequate TWC gas emissions 325 including CO, H2O, NH3, and NOx. The NH3 sensor 330 detects the NH3 component of the inadequate TWC gas emissions 325, which is a low amount. The NH3 sensor 330 maintains the detection of low amounts until the NH3 is no longer produced.

Graph 417 depicts a signal output from the NOx sensor 335 located at the downstream position 250 with the TWC 210 operating at inadequate effectiveness 310 to convert the exhaust gas constituents to inadequate TWC gas emissions 325 in response to the commanded switch from the lean AFR combustion state 316 to the rich AFR combustion state 318 and back to the lean AFR combustion state 316. As depicted, the SCR 220 is working inadequately. When the TWC 210 is operating at inadequate effectiveness 310 during rich AFR combustion state 318, the TWC 210 converts the exhaust gas constituents to inadequate TWC gas emissions 325 including CO, H2O, NH3, and NOx, which is indicated by the amplitude and time response of the signal output from the NOx sensor 335. The NOx sensor 335 detects a residual amount of NOx after the switch from lean AFR combustion state 316 to rich AFR combustion state 318 due to a positionally induced time delay, i.e., further downstream position than graph 342. The NOx sensor 335 detects the residual NOx component of the inadequate TWC gas emissions 325 and continues detection of NOx even through the commanded switch from the rich AFR combustion state 318 to the lean AFR combustion state 316.

It should be noted that the above is for exemplary purposes and is not inclusive of the possible scenarios. For example, although a certain dwell period is shown on graph 331 before switching to lean combustion, the dwell period may be variable before switching to lean combustion. That is, the control module can operate in rich combustion for a predetermined amount of time or calculate a time period based on operating conditions and request an immediate switch to lean AFR combustion state 316. Similarly, with respect to graphs 336 and 337, the control module 205 may request an immediate switch from rich to lean AFR combustion state 318, 316, respectively, upon detecting NH3 being at the downstream position 250. Alternatively, if the control module 205 detects the operation of a marginal TWC 210 but a satisfactory SCR 220, the control module 205 may request continuing operation in rich AFR combustion state 318 until it has been determined the SCR 220 has collected a sufficient amount of NH3 to operate in lean AFR combustion state 316.

The above description provides information upon which a catalyst monitoring scheme can be assembled. Many combinations of individual detections and combinations of detections can be formed to properly monitor and detect deteriorating condition of the SCR 220, TWC 210, or both using the NH3 sensor 330 and NOx sensor 335 at the upstream, mid-brick, and downstream positions 230, 240, and 250 respectively. Examples include detection of the condition of a satisfactory SCR 220 and a marginal TWC 210. Detection can occur with the single upstream position 230 being the NH3 sensor 330, for example graph 341. When the engine 10 is operating in rich AFR combustion state 318 the marginal TWC 210 can be detected by a reduction in the expected NH3 level of graph 331. Similarly, the same condition can be detected by a NOx sensor 335 as the mid-brick position 240, graph 344, wherein a predetermined NOx level has not been met. Likewise, if only the NH3 sensor 330 is used at the mid-brick position 240 and time delay of the NH3 sensor 330 detecting NH3 output surpasses a predetermined time limit a marginal TWC 210 can be detected. Upon detection of any of these or other identifiable events, the control module 205 can set a resident code for later retrieval, illuminate a warning light, and send a message to the operator to inform an operator of the deteriorating condition of the TWC 210.

Similarly, individual sensor detection can detect the condition of a satisfactory TWC 210 and a marginal SCR 220. For example, if a NOx sensor 335 is located in the mid-brick position 240 or downstream position 250, graphs 364 and 367 respectively, detection can occur based on the shortened time period between detecting the combustion switch from pre-conditioning to rich AFR combustion state 318 or the higher than expected NOx levels after the switch from rich to lean AFR combustion state 318, 316, respectively.

Examples of combinations of sensor detections can be an NH3 sensor 330 in the mid-brick and downstream positions 240, 250 respectively, for example graphs 403, 406, the concentration of NH3 detected by the NH3 sensor 330 with similar detection times between the mid-brick and downstream positions 240, 250, can indicate a deteriorating SCR 220 condition. A mid-brick position 240 having both NH3 and NOx sensors 330, 335 can detect a TWC 210 in the marginal condition effectiveness 305, for example graphs 343 and 344, as the NH3 sensor 335 will identify a longer time delay before sensing NH3 input and at a lower level than was expected. While the NOx sensor 335 will continue detecting NOx molecules over an expected concentration of NOx emissions. When both of these detections are taken together, a more robust detection of the marginal TWC condition effectiveness 305 occurs. Upon detection of any of these events, the control module 5 can set a resident code for later retrieval, illuminate a warning light, and send a message to the operator to inform an operator the deteriorating condition of the TWC 210 or SCR 220.

It should be apparent that the exemplary detection schemes are not intended to be inclusive, but rather illustrative of the detection schemes that can be created. As illustrated, the detection schemes can be based on a single sensor position utilizing one or more sensors, based on a single type of sensor at multiple locations, or a combination of sensor types and locations. It will be recognized that the type and amount of sensors can vary dependent on the detection scheme in place.

Figure 6:
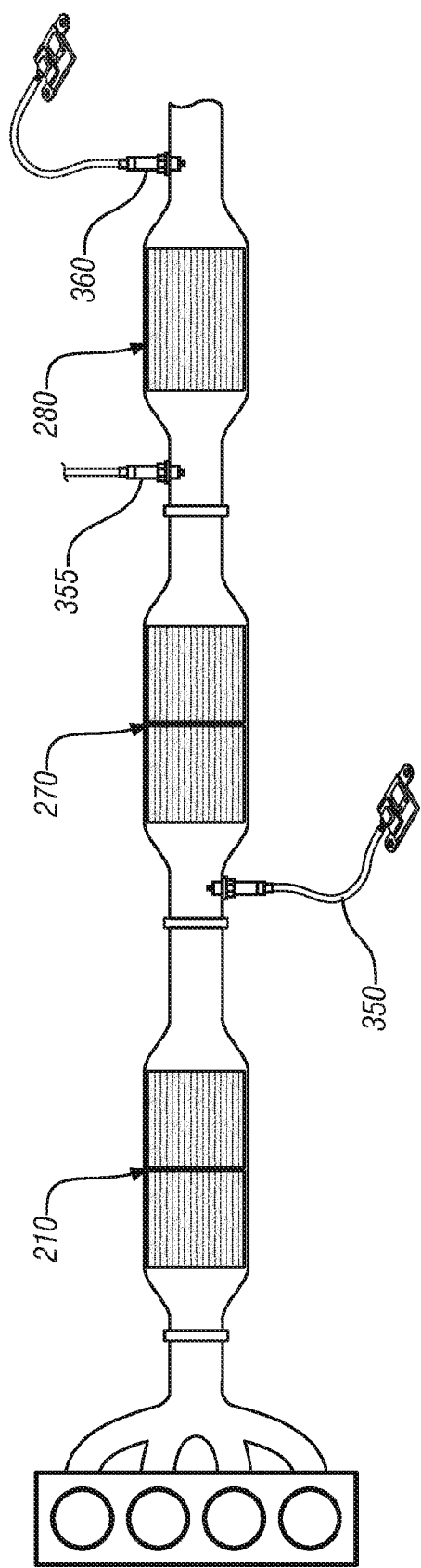
FIG. 6 shows an alternative embodiment of an aftertreatment system having a TWC, a first SCR, and a second SCR with an upstream sensor located before the first SCR, mid-brick sensor located between the first and second SCR, and downstream sensor located after the second SCR, in accordance with the present disclosure.

FIG. 6 shows an alternative embodiment of the passive selective catalytic reduction system 15 having a TWC 210, a first SCR 270, and a second SCR 280 with an upstream position 350 located after the TWC 210 and before the first SCR 270, mid-brick position 355 located between the first and second SCRs 270, 280 respectively, and downstream position 360 located after the second SCR 280. The TWC 210 is substantially similar to the TWC 210 described above. The first and second SCRs 270, 280 are substantially similar to the SCR 220 described above. Each upstream, mid-brick, and downstream positions 350, 355, 360 can be monitored using an NH3 sensor 330, a NOx sensor 335, or both. The upstream position 350 responds in a similar manner as described above.

The first and second SCR 270, 280 have a defined effective temperature range as is known by one of ordinary skill in the art. The SCR 270 is placed close to the engine to quickly reach the operating range. However, the closely placed SCR 270 can exceed its operating temperature after prolonged use or when operational issues or malfunctions within the engine 10 occur. A second SCR 280 can be placed downstream the first SCR 270 that will remain cooler than the first SCR 270. If the first SCR 270 exceeds the temperature range, the second SCR 280 will be within its operational temperature range. Therefore, when two SCR catalysts are used, the first SCR 270 is a primary and the second SCR 280 is operated as a secondary emissions conversion source.

The upstream position 350 reacts as the upstream position described above with respect to the single SCR 220. The mid-brick position 355 acts substantially similar to the downstream position 250 with respect to the single SCR 220. The downstream position 360 also acts substantially similar to the downstream position 250 of the single SCR but in a delayed manner. That is, when the first SCR 270 is operating within the operating temperature range, the response of the downstream position 360 will be positionally delayed but will be similarly responsive as the mid-brick position 355. When the first SCR 270 exceeds its operating temperature range, the mid-brick position 355 will have readings similar to the readings of the upstream position 350 and the downstream position 360 will have similar readings to the downstream position 250.

The above description provides information upon which a catalyst monitoring scheme can be assembled. Combinations of individual detections and combinations of detections can be formed to properly diagnose the deteriorating condition of the TWC 210, first SCR 270, and second SCR 280 or a combination thereof. Upon detection of deterioration of the TWC 210 the first SCR 270, or the second SCR 280, the control module 205 can set a resident code for later retrieval, illuminate a warning light, and send a message to the operator to inform an operator of the deteriorating condition of the TWC 210, SCR 220, SCR270, and SCR 280.

The above description provides information upon which an engine control scheme can be assembled. Combinations of individual and combined detections can be formed to properly control engine operation. For example, when the TWC 210 and SCR 220 are operating satisfactory detection of NH3 at the downstream position 250 can immediately cause a switch from the rich combustion mode 318 to the lean combustion mode 316. Likewise, a detection of NOx at the downstream position 250 can immediately cause a switch from the lean combustion mode 316 to the rich combustion mode 318. As will be apparent, engine control based on the various conditions of the TWC 210 and the SCR 220 can be created wherein detection of certain emissions can cause a change in engine operating modes or controls.

In a further embodiment of FIG. 2, the engine 10 can begin the preconditioning operation in a rich combustion mode thereby causing the TWC 210 to produce NH3. The NH3 is collected on the SCR 220 and stored for later use, as described in detail above. The downstream position 250 detects when the SCR 220 has become saturated with NH3 and the control module 205 commands a switch from the rich combustion to the lean combustion mode. The detection scheme is similar to that described above when detecting the TWC 210 and SCR 220 function in the rich to lean combustion mode transition.

In another embodiment of FIG. 2, the passive selective catalytic reduction system 15 can include a catalytic fluid injection system. The catalytic fluid injection system includes an injector, a storage tank, and a pump to supply catalytic from the storage tank to the injector. In one embodiment, urea is the catalytic fluid used and can catalyze NOx exhaust gas similarly to NH3. The catalytic fluid injection system is controlled by the controller 205. The injector is positioned before the SCR 220 to inject urea into the exhaust gas feedstream and deposit the catalytic fluid on the SCR 220. When the downstream position 360 detects ammonia slip, the catalytic fluid injection stops. When the downstream position 360 detects a reduced concentration of N2 and H2O molecules being produced from the SCR 220, the control module 205 will request additional urea to be injected into the exhaust gas feedstream. The detection scheme is similar to that described above for detecting the TWC 210 and SCR 220 function with respect to NOx detection.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring performance of a passive selective catalytic reduction system configured to treat an exhaust gas feedstream from an internal combustion engine, the passive selective catalytic reduction system including a three-way catalytic device fluidly coupled upstream of a selective catalytic reduction catalyst, the method comprising:
    operating the internal combustion engine in a preconditioning mode; and then
    introducing an air/fuel excursion into the exhaust gas feedstream and monitoring a signal output from a sensor monitoring the exhaust gas feedstream in the passive selective catalytic reduction system during the air/fuel excursion; and
    determining an operating effectiveness for the passive selective catalytic reduction system correlated to the signal output from the sensor monitoring the exhaust gas feedstream, comprising:
        determining an operating effectiveness for the three-way catalytic device correlated to the signal output from the sensor monitoring the exhaust gas feedstream subsequent to introducing the air/fuel excursion; and
        determining an operating effectiveness for the selective catalytic reduction catalyst correlated to the signal output from the sensor monitoring the exhaust gas feedstream subsequent to introducing the air/fuel excursion.

2. The method of claim 1, wherein the sensor monitoring the exhaust gas feedstream comprises an ammonia sensor located in the passive selective catalytic reduction system at one of a mid-brick position within the selective catalytic reduction catalyst and a downstream position relative to the selective catalytic reduction catalyst.

3. The method of claim 2, wherein determining the operating effectiveness for the passive selective catalytic reduction system correlated to the signal output from the ammonia sensor located in the selective catalytic reduction catalyst at one of the mid-brick position and the downstream position comprises monitoring an amplitude of the signal output from the ammonia sensor.

4. The method of claim 3, comprising detecting the selective catalytic reduction catalyst is at an inadequate operating effectiveness when the amplitude of the signal output from the ammonia sensor is less than a predetermined amplitude.

5. The method of claim 2, wherein determining the operating effectiveness for the passive selective catalytic reduction system correlated to the signal output from the ammonia sensor located in the selective catalytic reduction catalyst at one of the mid-brick position and the downstream position comprises monitoring a time delay of the signal output from the ammonia sensor.

6. The method of claim 5, comprising detecting the passive selective catalytic reduction system is at an inadequate operating effectiveness when the time delay of the signal output from the ammonia sensor is greater than a predetermined delay.

7. The method of claim 2, wherein determining the operating effectiveness for the passive selective catalytic reduction system correlated to the signal output from the ammonia sensor comprises determining the operating effectiveness for the passive selective catalytic reduction system based upon a time delay of the signal output from the ammonia sensor and an amplitude of the signal output from the ammonia sensor.

8. The method of claim 1, wherein the sensor monitoring the exhaust gas feedstream comprises a nitrogen oxide sensor located in the passive selective catalytic reduction system at one of a mid-brick position within the selective catalytic reduction catalyst and a downstream position relative to the selective catalytic reduction catalyst.

9. The method of claim 8, wherein determining the operating effectiveness for the passive selective catalytic reduction system correlated to the signal output from the nitrogen oxide sensor located in the selective catalytic reduction catalyst at one of the mid-brick position and the downstream position comprises monitoring an amplitude of the signal output from the nitrogen oxide sensor.

10. The method of claim 9, comprising detecting the passive selective catalytic reduction system is at an inadequate operating effectiveness when the amplitude of the signal output from the nitrogen oxide sensor is less than a predetermined amplitude.

11. The method of claim 8, wherein determining the operating effectiveness for the passive selective catalytic reduction system correlated to the signal output from the nitrogen oxide sensor located in the selective catalytic reduction catalyst at one of the mid-brick position and the downstream position comprises monitoring a time delay of the signal output from the nitrogen oxide sensor.

12. The method of claim 11, comprising detecting the passive selective catalytic reduction system is at an inadequate operating effectiveness when the time delay of the signal output from the nitrogen oxide sensor is greater than a predetermined delay.

13. The method of claim 8, wherein determining the operating effectiveness for the passive selective catalytic reduction system correlated to the signal output from the nitrogen oxide sensor comprises determining the operating effectiveness for the passive selective catalytic reduction system based upon a time delay of the signal output from the nitrogen oxide sensor and an amplitude of the signal output from the nitrogen oxide sensor.

14. The method of claim 1, wherein operating the internal combustion engine in the preconditioning mode comprises operating the internal combustion engine at a lean air/fuel ratio.

15. The method of claim 1, wherein operating the internal combustion engine in the preconditioning mode comprises operating the internal combustion engine at a rich air/fuel ratio.

16. The method of claim 1, wherein introducing the air/fuel excursion into the exhaust gas feedstream comprises operating the internal combustion engine at a rich air/fuel ratio.

17. The method of claim 16, wherein operating the internal combustion engine at a rich air/fuel ratio comprises operating in the rich air/fuel ratio until the signal output from the sensor monitoring the exhaust gas feed stream detects the rich air/fuel ratio.

18. The method of claim 1, wherein the sensor is positioned between the three-way catalytic device and the selective catalytic reduction catalyst.

19. A method for monitoring performance of a passive selective catalytic reduction system configured to treat an exhaust gas feedstream from an internal combustion engine, the passive selective catalytic reduction system including a three-way catalytic device fluidly coupled upstream of a selective catalytic reduction catalyst, the method comprising:
    operating the internal combustion engine in a preconditioning mode; and then
    introducing an air/fuel excursion into the exhaust gas feedstream;
    monitoring a first signal output from a first sensor monitoring the exhaust gas feedstream in the passive selective catalytic reduction system at a position within the selective catalytic reduction catalyst during the air/fuel excursion;
    monitoring a second signal output from a second sensor monitoring the exhaust gas feedstream in the passive selective catalytic reduction system at a position downstream of the selective catalytic reduction catalyst during the air/fuel excursion; and
    determining an operating effectiveness for the selective catalytic reduction catalyst based on a comparison of the first and second signals.

20. A method for monitoring performance of a passive selective catalytic reduction system configured to treat an exhaust gas feedstream from an internal combustion engine, the passive selective catalytic reduction system including a three-way catalytic device fluidly coupled upstream of a selective catalytic reduction catalyst, the method comprising:
    operating the internal combustion engine in a preconditioning mode comprising operating the internal combustion engine at a lean air/fuel ratio; and then
    introducing an air/fuel excursion into the exhaust gas feedstream comprising operating the internal combustion engine at a rich air/fuel ratio;
    monitoring a signal output from a sensor monitoring the exhaust gas feedstream in the passive selective catalytic reduction system during the air/fuel excursion; and
    determining an operating effectiveness for the passive selective catalytic reduction system correlated to the signal output from the sensor monitoring the exhaust gas feedstream, comprising:
        determining an operating effectiveness for the three-way catalytic device correlated to the signal output from the sensor monitoring the exhaust gas feedstream; and
        determining an operating effectiveness for the selective catalytic reduction catalyst correlated to the signal output from the sensor monitoring the exhaust gas feedstream.

\* \* \* \* \*